(12) United States Patent
Tahmasebi Maraghoosh

(10) Patent No.: US 12,736,390 B2
(45) Date of Patent: Sep. 15, 2026

(54) SYSTEM, METHOD, AND COMPUTER PROGRAM PRODUCT FOR CALIBRATING ULTRASONIC FLOW SENSORS

(71) Applicant: Becton, Dickinson and Company, Franklin Lakes, NJ (US)

(72) Inventor: Amir Mohammad Tahmasebi Maraghoosh, Newton, MA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 269 days.

(21) Appl. No.: 18/745,484

(22) Filed: Jun. 17, 2024

(65) Prior Publication Data

US 2025/0383227 A1 Dec. 18, 2025

(51) Int. Cl.
*G01F 25/00* (2022.01)
*G01F 1/66* (2022.01)
*G01F 25/10* (2022.01)

(52) U.S. Cl.
CPC .............. *G01F 25/10* (2022.01); *G01F 1/662* (2013.01)

(58) Field of Classification Search
CPC ................................. G01F 25/10; G01F 1/662
See application file for complete search history.

(56) References Cited

U.S. PATENT DOCUMENTS 5,594,181 A * 1/1997 Stange .................... G01F 1/662 73/861.27
6,192,739 B1 2/2001 Logue et al.
6,474,165 B1 * 11/2002 Harper ............... G01N 29/2487 73/628
2007/0169537 A1 * 7/2007 Cotton .................... G01F 1/667 702/100
2011/0271769 A1 11/2011 Kippersund et al.
2019/0219429 A1 * 7/2019 Nielsen ................... G01F 25/10
2021/0223084 A1 7/2021 Verma
2021/0231471 A1 7/2021 Picot et al.
2023/0273054 A1 * 8/2023 DeKalb ............. A61M 5/16804 73/861.08

FOREIGN PATENT DOCUMENTS

EP 2154491 A1 2/2010
WO 2023183417 A1 9/2023

OTHER PUBLICATIONS

Qiu et al., “A survey of machine learning for big data processing”, EURASIP Journal on Advances in Signal Processing, 2016, 16 pages, vol. 67.

* cited by examiner

*Primary Examiner* — Jamel E Williams
(74) *Attorney, Agent, or Firm* — The Webb Law Firm

(57) ABSTRACT

Systems, methods, and computer program products are provided for calibrating ultrasonic flow sensors. An example system includes an ultrasonic flow sensor that includes a flow tube, a first piezoelectric sensor or transducer, and a second piezoelectric sensor or transducer; and at least one processor configured to: (vi) modify, based on (i) whether a signal-to-noise ratio (SNR) associated with at least one ultrasonic signal satisfies at least one threshold SNR ratio and (ii) whether the at least one ultrasonic signal includes saturation, a number of excitation pulses included in an excitation pulse pattern.

20 Claims, 9 Drawing Sheets

SYSTEM, METHOD, AND COMPUTER PROGRAM PRODUCT FOR CALIBRATING ULTRASONIC FLOW SENSORS

BACKGROUND

Technical Field

This disclosure relates generally to ultrasonic flow sensors and, in non-limiting embodiments or aspects, to systems, methods, and computer program products for calibrating ultrasonic flow sensors.

Technical Considerations

Manufacturing of flow tubes for ultrasonic flow sensors may only guarantee a length of the flow tubes with a percentage error (e.g., metallic tube length can only be guaranteed by +/−4% error, etc.), which is significant and may introduce a same amount of error in volume measurements of the ultrasonic flow sensors. Introduction of an additional step during manufacturing to measure a more accurate or actual flow tube length adds unwanted additional manufacturing costs. Accordingly, there is a need for a more accurate estimation of flow tube length for use in calibrating ultrasonic flow sensors that does not introduce an extra step during manufacturing and avoids increasing production cost of the ultrasonic flow sensors.

Existing ultrasonic flow sensors may set and use a fixed pulse ping pattern for exciting ultrasound crystals of piezoelectric sensors or transducers. Due to out of control circumstances, such as crystal impedance, fluid material properties, or the like, a time-series sampled at a receiving piezoelectric sensor or transducer received may have a low signal-to-noise ratio (SNR) and/or signal saturation (e.g., due to limitations of analog-to-digital converters (ADCs) used for the sampling, etc.). Accordingly, there is a need for an improvement in the setting and use of a pulse ping pattern for exciting ultrasound crystals of piezoelectric sensors or transducers of ultrasonic flow sensors.

SUMMARY

Accordingly, provided are improved systems, methods, and computer program products for calibrating ultrasonic flow sensors.

According to non-limiting embodiments or aspects, provided is a system including: an ultrasonic flow sensor that includes a flow tube, a first piezoelectric sensor or transducer arranged at an upstream position of the flow tube, and a second piezoelectric sensor or transducer arranged at a downstream position of the flow tube; and at least one processor configured to: (i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof; (ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points; (iii) determine, based on the time-series that includes the plurality of amplitudes of the at least one ultrasonic signal sampled at the plurality of time points, a signal-to-noise ratio (SNR) associated with the at least one ultrasonic signal; (iv) determine whether the SNR associated with the at least one ultrasonic signal satisfies at least one threshold SNR ratio; (v) determine, based on the time-series that includes the plurality of amplitudes of the at least one ultrasonic signal sampled at the plurality of time points, whether the at least one ultrasonic signal includes saturation; (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

In some non-limiting embodiments or aspects, the at least one processor is configured to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by: in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

In some non-limiting embodiments or aspects, the at least one processor is further configured to: repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

In some non-limiting embodiments or aspects, the at least one processor is configured to modify, based (i) whether the SNR associated with the at least one ultrasonic signal satisfies the at least one threshold SNR ratio and (ii) whether the at least one ultrasonic signal includes saturation, the number of excitation pulses included in the excitation pulse pattern by: providing, as input to one or more machine learning models, at least one of the time-series, the SNR, an indication of whether the at least one ultrasonic signal includes saturation, or any combination thereof; and receiving, as output from the one or more machine learning models, a modification to the number of excitation pulses included in the excitation pulse pattern.

In some non-limiting embodiments or aspects, the at least one processor is configured to determine, based on the time-series that includes the plurality of amplitudes of the at least one ultrasonic signal sampled at the plurality of time points, the SNR associated with the at least one ultrasonic signal according to the following Equation:

$$SNR = \frac{\sum sig[n_1:n_2]^2}{4\sum sig[n_3:n_4]^2}$$

where $n_1$ and $n_2$ are time points of the plurality of time points of the time-series that includes the plurality of amplitudes of the at least one ultrasonic signal sampled at the plurality of time points, and where $n_3$ and $n_4$ are further time points of a plurality of further time points of a further time-series representative of noise.

In some non-limiting embodiments or aspects, the at least one processor is configure to determine, based on the time-series that includes the plurality of amplitudes of the at least one ultrasonic signal sampled at the plurality of time points, whether the at least one ultrasonic signal includes saturation by: determining a maximum amplitude of the plurality of amplitudes of the at least one ultrasonic signal sampled at the plurality of time points; determining whether the time-series includes a number of consecutive time points of the plurality of time points with an amplitude that corresponds to the maximum amplitude; in response to determining that the time-series includes the number of consecutive time points of the plurality of time points with the amplitude that corresponds to the maximum amplitude, determining that the at least one ultrasonic signal includes saturation; and in response to determining that the time-series does not include the number of consecutive time points of the plurality of time points with the amplitude that corresponds to the maximum amplitude, determining that the at least one ultrasonic signal does not include saturation.

In some non-limiting embodiments or aspects, the at least one processor is configure to determine, based on the time-series that includes the plurality of amplitudes of the at least one ultrasonic signal sampled at the plurality of time points, whether the at least one ultrasonic signal includes saturation by: providing, as input to at least one machine learning model, the time-series; and receiving, as output from the at least one machine learning model, a prediction of whether the at least one ultrasonic signal includes saturation.

According to non-limiting embodiments or aspects, provided is a method for calibrating an ultrasonic flow sensor that includes a flow tube, a first piezoelectric sensor or transducer arranged at an upstream position of the flow tube, and a second piezoelectric sensor or transducer arranged at a downstream position of the flow tube, the method including: (i) providing, with at least one processor, an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof; (ii) receiving, with the at least one processor, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points; (iii) determining, with the at least one processor, based on the time-series that includes the plurality of amplitudes of the at least one ultrasonic signal sampled at the plurality of time points, a signal-to-noise ratio (SNR) associated with the at least one ultrasonic signal; (iv) determining, with the at least one processor, whether the SNR associated with the at least one ultrasonic signal satisfies at least one threshold SNR ratio; (v) determining, with the at least one processor, based on the time-series that includes the plurality of amplitudes of the at least one ultrasonic signal sampled at the plurality of time points, whether the at least one ultrasonic signal includes saturation; (vi) modifying, with the at least one processor, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

In some non-limiting embodiments or aspects, modifying, with the at least one processor, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern includes: in response to determining that the SNR associated with the at least one ultrasonic signal satisfies the at least one threshold SNR ratio, increasing, with the at least one processor, the number of excitation pulses included in the excitation pulse pattern; and in response to determining that the at least one ultrasonic signal includes saturation, decreasing, with the at least one processor, the number of excitation pulses included in the excitation pulse pattern.

In some non-limiting embodiments or aspects, the method further includes: repeating, with the at least one processor, (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

In some non-limiting embodiments or aspects, modifying, with the at least one processor, based (i) whether the SNR associated with the at least one ultrasonic signal satisfies the at least one threshold SNR ratio and (ii) whether the at least one ultrasonic signal includes saturation, the number of excitation pulses included in the excitation pulse pattern includes: providing, with the at least one processor, as input to one or more machine learning models, at least one of the time-series, the SNR, an indication of whether the at least one ultrasonic signal includes saturation, or any combination thereof; and receiving, with the at least one processor, as output from the one or more machine learning models, a modification to the number of excitation pulses included in the excitation pulse pattern.

In some non-limiting embodiments or aspects, the at least one processor determines, based on the time-series that includes the plurality of amplitudes of the at least one ultrasonic signal sampled at the plurality of time points, the SNR associated with the at least one ultrasonic signal according to the following Equation:

$$SNR = \frac{\sum sig[n_1 : n_2]^2}{4\sum sig[n_3 : n_4]^2}$$

where $n_1$ and $n_2$ are time points of the plurality of time points of the time-series that includes the plurality of amplitudes of the at least one ultrasonic signal sampled at the plurality of time points, and where $n_3$ and $n_4$ are further time points of a plurality of further time points of a further time-series representative of noise.

In some non-limiting embodiments or aspects, determining, with the at least one processor, based on the time-series that includes the plurality of amplitudes of the at least one ultrasonic signal sampled at the plurality of time points, whether the at least one ultrasonic signal includes saturation includes: determining, with the at least one processor, a maximum amplitude of the plurality of amplitudes of the at least one ultrasonic signal sampled at the plurality of time points; determining, with the at least one processor, whether the time-series includes a number of consecutive time points of the plurality of time points with an amplitude that corresponds to the maximum amplitude; in response to determining that the time-series includes the number of consecutive time points of the plurality of time points with the amplitude that corresponds to the maximum amplitude, determining, with the at least one processor, that the at least one ultrasonic signal includes saturation; and in response to determining that the time-series does not include the number of consecutive time points of the plurality of time points with the amplitude that corresponds to the maximum amplitude, determining, with the at least one processor, that the at least one ultrasonic signal does not include saturation.

In some non-limiting embodiments or aspects, determining, with the at least one processor, based on the time-series that includes the plurality of amplitudes of the at least one ultrasonic signal sampled at the plurality of time points, whether the at least one ultrasonic signal includes saturation includes: providing, with the at least one processor, as input to at least one machine learning model, the time-series; and receiving, with the at least one processor, as output from the at least one machine learning model, a prediction of whether the at least one ultrasonic signal includes saturation.

According to non-limiting embodiments or aspects, provided is an ultrasonic flow sensor comprising: a flow tube; a first piezoelectric sensor or transducer arranged at an upstream position of the flow tube; a second piezoelectric sensor or transducer arranged at a downstream position of the flow tube; and at least one processor configured to: (i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof; (ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points; (iii) determine, based on the time-series that includes the plurality of amplitudes of the at least one ultrasonic signal sampled at the plurality of time points, a signal-to-noise ratio (SNR) associated with the at least one ultrasonic signal; (iv) determine whether the SNR associated with the at least one ultrasonic signal satisfies at least one threshold SNR ratio; (v) determine, based on the time-series that includes the plurality of amplitudes of the at least one ultrasonic signal sampled at the plurality of time points, whether the at least one ultrasonic signal includes saturation; (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

In some non-limiting embodiments or aspects, the at least one processor is configured to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by: in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

In some non-limiting embodiments or aspects, the at least one processor is further configured to: repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

According to non-limiting embodiments or aspects, provided is a computer program product including a non-transitory computer readable medium including program instructions for calibrating an ultrasonic flow sensor that includes a flow tube, a first piezoelectric sensor or transducer arranged at an upstream position of the flow tube, and a second piezoelectric sensor or transducer arranged at a downstream position of the flow tub which, when executed by at least one processor, cause the at least one processor to: (i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof; (ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points; (iii) determine, based on the time-series that includes the plurality of amplitudes of the at least one ultrasonic signal sampled at the plurality of time points, a signal-to-noise ratio (SNR) associated with the at least one ultrasonic signal; (iv) determine whether the SNR associated with the at least one ultrasonic signal satisfies at least one threshold SNR ratio; (v) determine, based on the time-series that includes the plurality of amplitudes of the at least one ultrasonic signal sampled at the plurality of time points, whether the at least one ultrasonic signal includes saturation; (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

In some non-limiting embodiments or aspects, the program instructions, when executed by the at least one processor, cause the at least one processor to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by: in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

In some non-limiting embodiments or aspects, the program instructions, when executed by the at least one processor, further cause the at least one processor to repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

Further non-limiting embodiments or aspects are set forth in the following numbered clauses:

Clause 1. A system comprising: an ultrasonic flow sensor that includes a flow tube, a first piezoelectric sensor or transducer arranged at an upstream position of the flow tube, and a second piezoelectric sensor or transducer arranged at a downstream position of the flow tube; and at least one processor configured to: (i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof; (ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points; (iii) determine, based on the time-series that includes the plurality of amplitudes of the at least one ultrasonic signal sampled at the plurality of time points, a signal-to-noise ratio (SNR) associated with the at least one ultrasonic signal; (iv) determine whether the SNR associated with the at least one ultrasonic signal satisfies at least one threshold SNR ratio; (v) determine, based on the time-series that includes the plurality of amplitudes of the at least one ultrasonic signal sampled at the plurality of time points, whether the at least one ultrasonic signal includes saturation; and (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

Clause 2. The system of clause 1, wherein the at least one processor is configured to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by: in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

Clause 3. The system of clause 1 or 2, wherein the at least one processor is further configured to: repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

Clause 4. The system of any of clauses 1-3, wherein the at least one processor is configured to modify, based (i) whether the SNR associated with the at least one ultrasonic signal satisfies the at least one threshold SNR ratio and (ii) whether the at least one ultrasonic signal includes saturation, the number of excitation pulses included in the excitation pulse pattern by: providing, as input to one or more machine learning models, at least one of the time-series, the SNR, an indication of whether the at least one ultrasonic signal includes saturation, or any combination thereof; and receiving, as output from the one or more machine learning models, a modification to the number of excitation pulses included in the excitation pulse pattern.

Clause 5. The system of any of clauses 1-4, wherein the at least one processor is configured to determine, based on the time-series that includes the plurality of amplitudes of the at least one ultrasonic signal sampled at the plurality of time points, the SNR associated with the at least one ultrasonic signal according to the following Equation:

$$SNR = \frac{\sum sig[n_1:n_2]^2}{4\sum sig[n_3:n_4]^2}$$

where $n_1$ and $n_2$ are time points of the plurality of time points of the time-series that includes the plurality of amplitudes of the at least one ultrasonic signal sampled at the plurality of time points, and where $n_3$ and $n_4$ are further time points of a plurality of further time points of a further time-series representative of noise.

Clause 6. The system of any of clauses 1-5, wherein the at least one processor is configure to determine, based on the time-series that includes the plurality of amplitudes of the at least one ultrasonic signal sampled at the plurality of time points, whether the at least one ultrasonic signal includes saturation by: determining a maximum amplitude of the plurality of amplitudes of the at least one ultrasonic signal sampled at the plurality of time points; determining whether the time-series includes a number of consecutive time points of the plurality of time points with an amplitude that corresponds to the maximum amplitude; in response to determining that the time-series includes the number of consecutive time points of the plurality of time points with the amplitude that corresponds to the maximum amplitude, determining that the at least one ultrasonic signal includes saturation; and in response to determining that the time-series does not include the number of consecutive time points of the plurality of time points with the amplitude that corresponds to the maximum amplitude, determining that the at least one ultrasonic signal does not include saturation.

Clause 7. The system of any of clauses 1-7, wherein the at least one processor is configure to determine, based on the time-series that includes the plurality of amplitudes of the at least one ultrasonic signal sampled at the plurality of time points, whether the at least one ultrasonic signal includes saturation by: providing, as input to at least one machine learning model, the time-series; and receiving, as output from the at least one machine learning model, a prediction of whether the at least one ultrasonic signal includes saturation.

Clause 8. A method for calibrating an ultrasonic flow sensor that includes a flow tube, a first piezoelectric sensor or transducer arranged at an upstream position of the flow tube, and a second piezoelectric sensor or transducer arranged at a downstream position of the flow tube, the method comprising: (i) providing, with at least one processor, an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof; (ii) receiving, with the at least one processor, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points; (iii) determining, with the at least one processor, based on the time-series that includes the plurality of amplitudes of the at least one ultrasonic signal sampled at the plurality of time points, a signal-to-noise ratio (SNR) associated with the at least one ultrasonic signal; (iv) determining, with the at least one processor, whether the SNR associated with the at least one ultrasonic signal satisfies at least one threshold SNR ratio; (v) determining, with the at least one processor, based on the time-series that includes the plurality of amplitudes of the at least one ultrasonic signal sampled at the plurality of time points, whether the at least one ultrasonic signal includes saturation; and (vi) modifying, with the at least one processor, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

Clause 9. The method of clause 8, wherein modifying, with the at least one processor, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern includes: in response to determining that the SNR associated with the at least one ultrasonic signal satisfies the at least one threshold SNR ratio, increasing, with the at least one processor, the number of excitation pulses included in the excitation pulse pattern; and in response to determining that the at least one ultrasonic signal includes saturation, decreasing, with the at least one processor, the number of excitation pulses included in the excitation pulse pattern.

Clause 10. The method of clause 8 or 9, further comprising: repeating, with the at least one processor, (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

Clause 11. The method of any of clauses 8-10, wherein modifying, with the at least one processor, based (i) whether the SNR associated with the at least one ultrasonic signal satisfies the at least one threshold SNR ratio and (ii) whether the at least one ultrasonic signal includes saturation, the number of excitation pulses included in the excitation pulse pattern includes: providing, with the at least one processor, as input to one or more machine learning models, at least one of the time-series, the SNR, an indication of whether the at least one ultrasonic signal includes saturation, or any combination thereof; and receiving, with the at least one processor, as output from the one or more machine learning models, a modification to the number of excitation pulses included in the excitation pulse pattern.

Clause 12. The method of any of clauses 8-11, wherein the at least one processor determines, based on the time-series that includes the plurality of amplitudes of the at least one ultrasonic signal sampled at the plurality of time points, the SNR associated with the at least one ultrasonic signal according to the following Equation:

$$SNR = \frac{\sum sig[n_1:n_2]^2}{4\sum sig[n_3:n_4]^2}$$

where $n_1$ and $n_2$ are time points of the plurality of time points of the time-series that includes the plurality of amplitudes of the at least one ultrasonic signal sampled at the plurality of time points, and where $n_3$ and $n_4$ are further time points of a plurality of further time points of a further time-series representative of noise.

Clause 13. The method of any of clauses 8-12, wherein determining, with the at least one processor, based on the time-series that includes the plurality of amplitudes of the at least one ultrasonic signal sampled at the plurality of time points, whether the at least one ultrasonic signal includes saturation includes: determining, with the at least one processor, a maximum amplitude of the plurality of amplitudes of the at least one ultrasonic signal sampled at the plurality of time points; determining, with the at least one processor, whether the time-series includes a number of consecutive time points of the plurality of time points with an amplitude that corresponds to the maximum amplitude; in response to determining that the time-series includes the number of consecutive time points of the plurality of time points with the amplitude that corresponds to the maximum amplitude, determining, with the at least one processor, that the at least one ultrasonic signal includes saturation; and in response to determining that the time-series does not include the number of consecutive time points of the plurality of time points with the amplitude that corresponds to the maximum amplitude, determining, with the at least one processor, that the at least one ultrasonic signal does not include saturation.

Clause 14. The method of any of clauses 8-13, wherein determining, with the at least one processor, based on the time-series that includes the plurality of amplitudes of the at least one ultrasonic signal sampled at the plurality of time points, whether the at least one ultrasonic signal includes saturation includes: providing, with the at least one processor, as input to at least one machine learning model, the time-series; and receiving, with the at least one processor, as output from the at least one machine learning model, a prediction of whether the at least one ultrasonic signal includes saturation.

Clause 15. An ultrasonic flow sensor comprising: a flow tube; a first piezoelectric sensor or transducer arranged at an upstream position of the flow tube; a second piezoelectric sensor or transducer arranged at a downstream position of the flow tube; and at least one processor configured to: (i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof; (ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points; (iii) determine, based on the time-series that includes the plurality of amplitudes of the at least one ultrasonic signal sampled at the plurality of time points, a signal-to-noise ratio (SNR) associated with the at least one ultrasonic signal; (iv) determine whether the SNR associated with the at least one ultrasonic signal satisfies at least one threshold SNR ratio; (v) determine, based on the time-series that includes the plurality of amplitudes of the at least one ultrasonic signal sampled at the plurality of time points, whether the at least one ultrasonic signal includes saturation; and (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

Clause 16. The ultrasonic flow sensor of clause 15, wherein the at least one processor is configured to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by: in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

Clause 17. The ultrasonic flow sensor of clause 15 or 16, wherein the at least one processor is further configured to: repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

Clause 18. A computer program product including a non-transitory computer readable medium including program instructions for calibrating an ultrasonic flow sensor that includes a flow tube, a first piezoelectric sensor or transducer arranged at an upstream position of the flow tube, and a second piezoelectric sensor or transducer arranged at a downstream position of the flow tub which, when executed by at least one processor, cause the at least one processor to: (i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof; (ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points; (iii) determine, based on the time-series that includes the plurality of amplitudes of the at least one ultrasonic signal sampled at the plurality of time points, a signal-to-noise ratio (SNR) associated with the at least one ultrasonic signal; (iv) determine whether the SNR associated with the at least one ultrasonic signal satisfies at least one threshold SNR ratio; (v) determine, based on the time-series that includes the plurality of amplitudes of the at least one ultrasonic signal sampled at the plurality of time points, whether the at least one ultrasonic signal includes saturation; and (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

Clause 19. The computer program product of clause 18, wherein the program instructions, when executed by the at least one processor, cause the at least one processor to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by: in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

Clause 20. The computer program product of clause 18 or 19, wherein the program instructions, when executed by the at least one processor, further cause the at least one processor to repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1A:
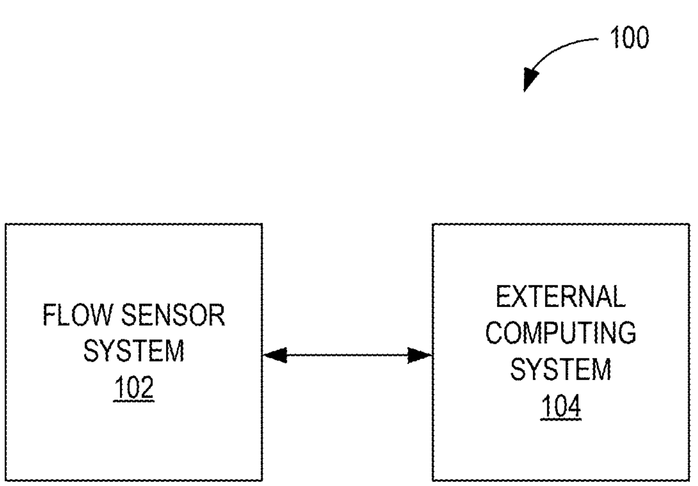
FIG. 1A is a schematic diagram of a system for calibrating ultrasonic flow sensors, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

Referring now to FIG. 1A, shown is a schematic diagram of a system for calibrating ultrasonic flow sensors, according to some non-limiting embodiments or aspects. As shown in FIG. 1A, system 100 may include flow sensor system 102 and/or external computing system 104. Systems and/or devices of system 100 can interconnect via wired connections, wireless connections, or a combination of wired and wireless connections.

Flow sensor system 102 may include one or more devices capable of receiving information and/or data from external computing device 104 and/or communicating information and/or data to external computing device 104. For example, flow sensor system 102 may include one or more computing systems including one or more processors (e.g., one or more computing devices, one or more mobile computing devices, one or more digital signal processors (DSPs), etc.). In some non-limiting embodiments or aspects, flow sensor system 102 may include the flow sensor system in U.S. Patent Application Publication No. 2021/0231471.

Figure 1B:
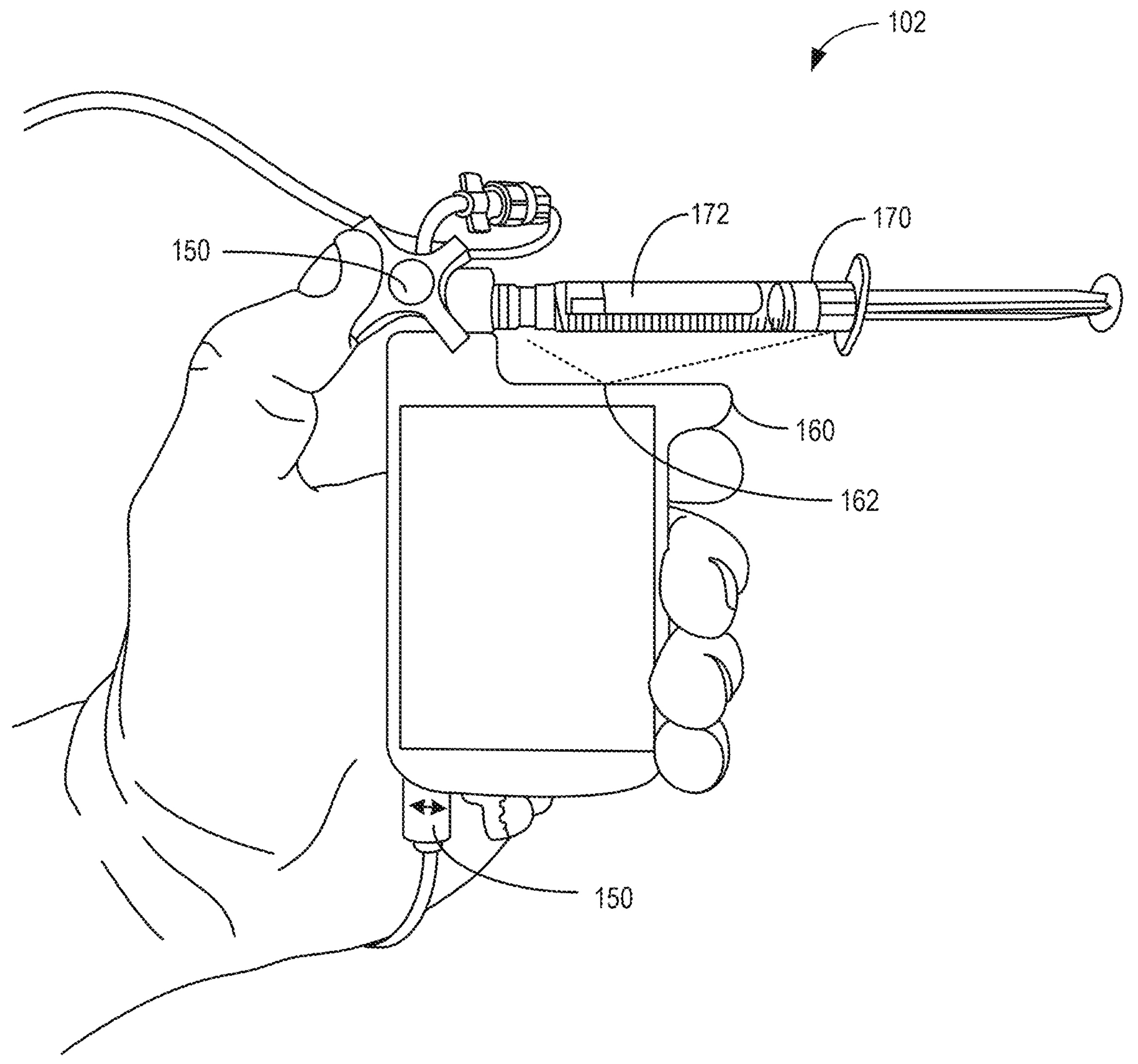
FIG. 1B is a perspective view of example components of a flow sensor system of the system for calibrating ultrasonic flow sensors of FIG. 1A, according to some non-limiting embodiments or aspects.

Referring also to FIG. 1B, FIG. 1B is a perspective view of example components of a flow sensor system of the system for calibrating ultrasonic flow sensors of FIG. 1A, according to some non-limiting embodiments or aspects. As shown in FIG. 1B, flow sensor system 102 may include ultrasonic flow sensor 150 and/or base 160. For example, ultrasonic flow sensor 150 may be configured to be removably, physically, and/or electrically connected to base 160. Syringe 170 may be configured to physically connect to flow sensor 160 (e.g., via a fluid injection port, etc.). Syringe 170 may include tag or label 172, which may include an NFC tag (e.g., an RFID tag, etc.) embedded in tag or label 104, a barcode, a QR code, an AprilTag, or the like. Base 160 may include at least one sensor 162 configured to read and/or decode medication information from tag or label 172 on syringe 170. The medication information may include at least one expected medication type associated with at least one medication contained in syringe 170, such as a medication identifier (e.g., a unique medication identifier associated with the medication contained in syringe 170, etc.). For example, the at least one sensor 162 of base 160 may include one or more computing devices, chips, contactless transmitters, contactless transceivers, NFC transmitters/receivers, RFID transmitters/receivers, contact based transmitters/receivers, optical sensors or scanners, barcode readers, or the like that are configured to read and/or decode the medication information stored or encapsulated in tag or label 172.

Figure 1C:
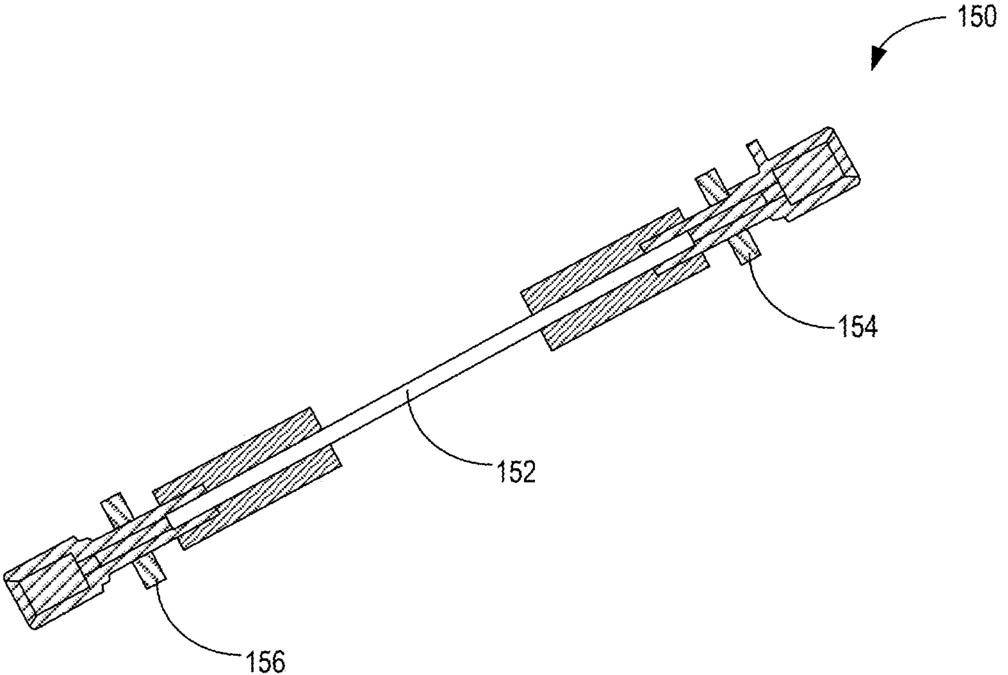
FIG. 1C is a cross-sectional view of example components of an ultrasonic flow sensor of a flow sensor system of the system for calibrating ultrasonic flow sensors of FIG. 1A, according to some non-limiting embodiments or aspects.

Referring also to FIG. 1C, FIG. 1C is a cross-sectional view of components of an ultrasonic flow sensor of a flow sensor system of the system for calibrating ultrasonic flow sensors of FIG. 1A, according to some non-limiting embodiments or aspects. As shown in FIG. 1C, ultrasonic flow sensor 150 may include flow tube 152 that defines a fluid flow path of ultrasonic flow sensor 150, first piezoelectric sensor or transducer 154 arranged at an upstream position of flow tube 152, and/or second piezoelectric sensor or transducer 156 arranged at a downstream position of flow tube 152.

Ultrasonic flow sensor 150 may be configured to generate a time-series corresponding to (e.g., corresponding to, representative of, quantifying, measuring, etc.) a flow of at least one fluid through a fluid flow path of ultrasonic flow sensor 150. For example, first piezoelectric sensor or transducer 154 and second piezoelectric sensor or transducer 156 may be configured to generate the time-series corresponding to the flow of the at least one fluid through the fluid flow path of ultrasonic flow sensor 150. As an example, first piezoelectric sensor or transducer 154 and second piezoelectric sensor or transducer 156 may each be configured to operate as both an ultrasonic transmitter and an ultrasonic receiver. In such an example, ultrasonic flow sensor 150 may be configured to operate by alternately transmitting and receiving a burst of ultrasound between the two transducers by measuring the transit time that it takes for sound to travel between the two transducers in both directions. An analog-to-digital converter (ADC) may sample the signal received at the receiving transducer at a plurality of time points to generate a time-series that includes the plurality of amplitudes sampled at the plurality of time points. The difference in the transit time (e.g., A time, etc.) measured may be directly proportional to a velocity of the fluid in the fluid flow path. A plurality of differences in transit time (e.g., a plurality of A times, etc.) may be represented as a time-series that includes at least one of a plurality of amplitudes at a plurality of time points, a plurality of phases at the plurality of time points, or any combination thereof. Ultrasonic flow sensor 150 may be configured to continually generate and provide the time-series corresponding to the flow of at least one fluid through a fluid flow path of ultrasonic flow sensor 150 during the flow of at least one fluid through a fluid flow path of ultrasonic flow sensor 150 (e.g., as the flow of at least one fluid through a fluid flow path of ultrasonic flow sensor 150 occurs and progresses, etc.).

Flow sensor system 102 and/or external computing system 104 may be configured to alternately provide an excitation pulse pattern including a number of excitation pulses to first piezoelectric sensor or transducer 154 and second piezoelectric sensor or transducer 156 to cause first piezoelectric sensor or transducer 154 and second piezoelectric sensor or transducer 156 to alternately transmit and recite the burst of ultrasound (e.g., a ultrasonic signal, etc.) between the two transducers. For example, first piezoelectric sensor or transducer 154 may be configured to transmit a first ultrasonic signal to second piezoelectric sensor or transducer 156, second piezoelectric sensor or transducer 156 may be configured to transmit a second ultrasonic signal to first piezoelectric transducer 156, second piezoelectric sensor or transducer 156 may be configured to receive the first ultrasonic signal transmitted by first piezoelectric sensor or transducer 154 (which may be sampled by an ADC to generate the time-series), and/or first piezoelectric sensor or transducer 156 may be configured to receive the second ultrasonic signal transmitted by second piezoelectric sensor or transducer 156 (which may be sampled by an ADC to generate the time-series).

External computing system 104 may include one or more devices capable of receiving information and/or data from flow sensor system 102 and/or communicating information and/or data to flow sensor system 102. For example, external computing system 104 may include one or more computing systems including one or more processors (e.g., one or more computing devices, one or more mobile computing devices, one or more servers, etc.). In some non-limiting embodiments or aspects, external computing system 104 includes a nurse station in a hospital, a hospital information system (HIS), an electronic medical records (EMR) system, a radiology information system (RIS), a picture archiving and communication system (PACS), a laboratory information system (LIS), a smart phone, a tablet computer, any combination thereof, and/or the like.

The number and arrangement of systems and devices shown in FIGS. 1A-1C are provided as an example. There may be additional systems or devices, fewer systems or devices, different systems or devices, or differently arranged systems or devices than those shown in FIGS. 1A-1C. Furthermore, two or more systems or devices shown in FIGS. 1A-1C may be implemented within a single system or device, or a single system or device shown in FIGS. 1A-1C may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
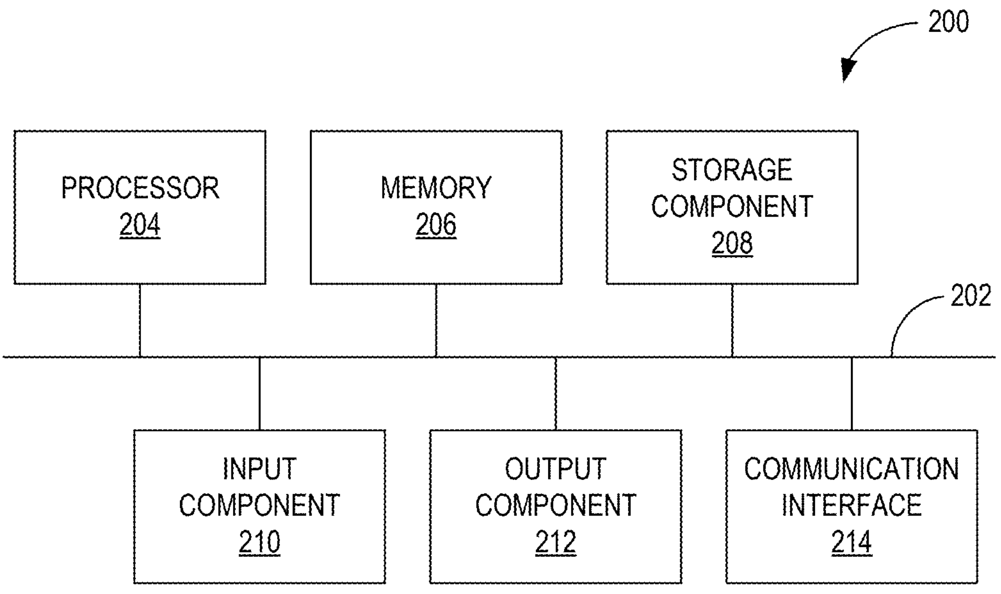
FIG. 2 is a schematic diagram of example components of one or more devices or systems of FIG. 1A, according to some non-limiting embodiments or aspects.

Referring now to FIG. 2, shown is a diagram of example components of a device 200 according to non-limiting embodiments. Device 200 may correspond to flow sensor system 102 and/or external computing system 104 in FIG. 1A, as an example. In some non-limiting embodiments, such systems or devices may include at least one device 200 and/or at least one component of device 200. The number and arrangement of components shown are provided as an example. In some non-limiting embodiments, device 200 may include additional components, fewer components, different components, or differently arranged components than those shown. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), or any processing component (e.g., a field-programmable gate array (FPGA), an application-specific integrated circuit (ASIC), etc.) that can be programmed to perform a function. Memory 206 may include random access memory (RAM), read only memory (ROM), or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid-state disk, etc.) or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, or the like.

Device 200 may perform one or more processes described herein. Device 200 may perform these processes based on processor 204 executing software instructions stored by a computer-readable medium, such as memory 206 or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to a specific arrangement of software, device(s), or hardware for performing or enabling one or more of the innovative functions (e.g., actions, processes, steps of a process, or the like) described herein. For example, "a processor configured to" may refer to a processor that executes specific software instructions (e.g., program code) that cause the processor to perform one or more functions related to fluid flow detection and/or identification.

Figure 3A:
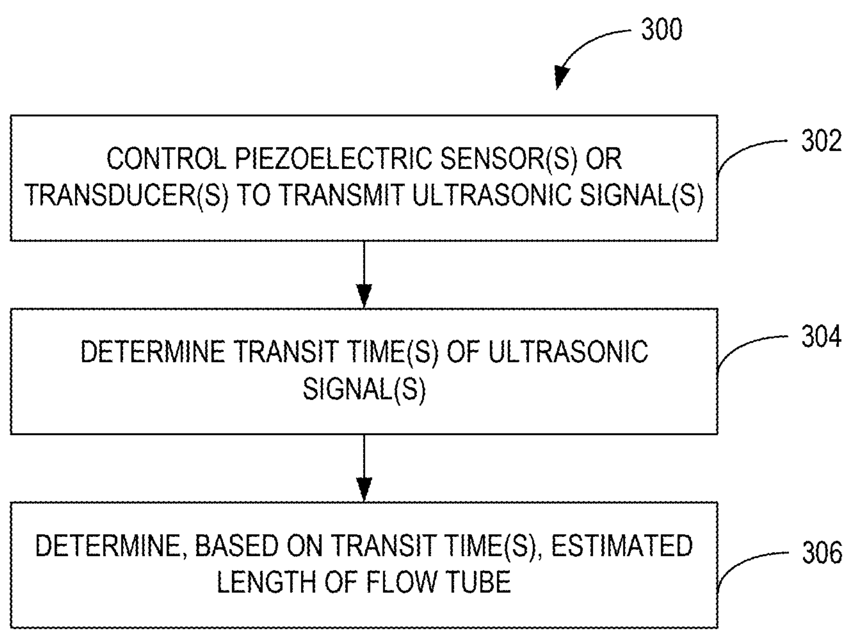
FIG. 3A is a flow diagram of a method for calibrating ultrasonic flow sensors, according to some non-limiting embodiments or aspects.

Referring now to FIG. 3A, shown is a flow diagram for a method 300 for calibrating ultrasonic flow sensors, according to some non-limiting embodiments or aspects. The steps shown in FIG. 3A are for example purposes only. It will be appreciated that additional, fewer, different, or a different order of steps may be used in some non-limiting embodiments or aspects. In some non-limiting embodiments or aspects, a step may be automatically performed in response to performance or completion of a prior step. The method 300 may be controlled or performed, in whole or in part, by one or more of the devices or systems described.

As shown in FIG. 3A, at step 302, method 300 includes controlling control at least one of a first piezoelectric sensor or transducer, a second piezoelectric sensor or transducer, or any combination thereof of an ultrasonic flow sensor to transmit at least one ultrasonic signal to the other of the first piezoelectric sensor or transducer, the second piezoelectric sensor or transducer, or any combination thereof. For example, flow sensor system 102 and/or external computing system 104 may control at least one of first piezoelectric sensor or transducer 154, second piezoelectric sensor or transducer 156, or any combination thereof of ultrasonic flow sensor 150 to transmit at least one ultrasonic signal to the other of first piezoelectric sensor or transducer 154, second piezoelectric sensor or transducer 156, or any combination thereof. As an example, flow sensor system 102 and/or external computing system 104 may provide an excitation pulse pattern including a number of excitation pulses to at least one of first piezoelectric sensor or transducer 154, second piezoelectric sensor or transducer 156, or any combination thereof to cause the least one of first piezoelectric sensor or transducer 154, second piezoelectric sensor or transducer 156, or any combination thereof to transmit the at least one ultrasonic signal to the other of first piezoelectric sensor or transducer 154, second piezoelectric sensor or transducer 156, or any combination thereof.

In some non-limiting embodiments or aspects, the at least one ultrasonic signal includes a first ultrasonic signal and a second ultrasonic signal. For example, flow sensor system 102 and/or external computing system 104 may control the at least one of first piezoelectric sensor or transducer 154, second piezoelectric sensor or transducer 156, or any combination thereof to transmit the at least one ultrasonic signal to the other of first piezoelectric sensor or transducer 154, second piezoelectric sensor or transducer 156, or any combination thereof by: controlling first piezoelectric sensor or transducer 154 to transmit the first ultrasonic signal to second piezoelectric sensor or transducer 156 and controlling second piezoelectric sensor or transducer 156 to transmit the second ultrasonic signal to first piezoelectric sensor or transducer 154. As an example, flow sensor system 102 and/or external computing system 104 may provide an excitation pulse pattern including a number of excitation pulses to first piezoelectric sensor or transducer 154 to cause first piezo electric sensor or transducer 154 transmit the first ultrasonic signal to second piezoelectric sensor or transducer 156, and flow sensor system 102 and/or external computing system 104 may provide the excitation pulse pattern including the number of excitation pulses to second piezoelectric sensor or transducer 156 to cause second piezoelectric sensor or transducer 156 transmit the second ultrasonic signal to first piezoelectric sensor or transducer 154. In such an example, flow sensor system 102 and/or external computing system 104 may provide the excitation pulse pattern including the number of excitation pulses to first piezo electric sensor or transducer 154 and second piezoelectric sensor or transducer 156 in an alternating manner (e.g., one after the other, etc.).

As shown in FIG. 3A, at step 304, method 300 includes determining a transit time of the at least one ultrasonic signal as at least one amount of time between transmission of the at least one ultrasonic signal by the at least one of the first piezoelectric sensor or transducer, the second piezoelectric sensor or transducer, or any combination thereof and reception of the at least one ultrasonic signal by the other of the first piezoelectric sensor or transducer, the second piezoelectric sensor or transducer, or any combination thereof. For example, flow sensor system 102 and/or external computing system 104 may determine a transit time of the at least one ultrasonic signal as at least one amount of time between transmission of the at least one ultrasonic signal by the at least one of first piezoelectric sensor or transducer 154, second piezoelectric sensor or transducer 156, or any combination thereof and reception of the at least one ultrasonic signal by the other of first piezoelectric sensor or transducer 154, second piezoelectric sensor or transducer 156, or any combination thereof.

In some non-limiting embodiments or aspects, when flow sensor system 102 and/or external computing system 104 control first piezoelectric sensor or transducer 154 to transmit the first ultrasonic signal to second piezoelectric sensor or transducer 156 and control second piezoelectric sensor or transducer 156 to transmit the second ultrasonic signal to first piezoelectric sensor or transducer 154, the as at least one amount of time includes (i) a first amount of time between transmission of the first ultrasonic signal by first piezoelectric sensor or transducer 154 and reception of the first ultrasonic signal by second piezoelectric sensor or transducer 156 and (ii) a second amount of time between transmission of the second ultrasonic signal by second piezoelectric sensor or transducer 156 and reception of the second ultrasonic signal by first piezoelectric sensor or transducer 156. As an example, the transit time may be determined as a sum of the first amount of time and the second amount of time, an average of the first amount of time and the second amount of time, or the like.

As shown in FIG. 3A, at step 306, method 300 includes determining based on the transit time and a speed of sound in at least one of (i) a material of a flow tube of the ultrasonic sensor, (ii) a fluid in the flow tube, or any combination thereof, an estimated length of the flow tube. For example, flow sensor system 102 and/or external computing system 104 may determine, based on the transit time and a known speed of sound in at least one of (i) a material of flow tube 152, (ii) a fluid in flow tube 152, or any combination thereof, an estimated length of flow tube 152. As an example, flow sensor system 102 and/or external computing system 104 may determine, based on the transit time and a known speed of sound in a material of flow tube 152 an estimated length of flow tube 152. As an example, flow sensor system 102 and/or external computing system 104 may determine, based on the transit time and a known speed of sound in a fluid in flow tube 152 an estimated length of flow tube 152.

In some non-limiting embodiments or aspects, the material of the flow tube includes a metal or other material that is acoustically predictable with low interference with the acoustic waves propagating through the fluid within the tube. For example, the metal may include stainless steel.

In some non-limiting embodiments or aspects, flow sensor system 102 and/or external computing system 104 may control, when flow tube 152 does not contain fluid (e.g., when flow tube 152 is empty, etc.), the at least one of first piezoelectric sensor or transducer 154, second piezoelectric sensor or transducer 156, or any combination thereof to transmit the at least one ultrasonic signal to the other of first piezoelectric sensor or transducer 154, second piezoelectric sensor or transducer 156, or any combination thereof. For example, if there is no fluid in flow tube 152, a main or major path for the at least one ultrasonic signal may be through flow tube 152. As an example, flow sensor system 102 and/or external computing system 104 may determine, based on the transit time and the known speed of sound in at least one of (i) the material of flow tube 152, (ii) the fluid in flow tube 152, or any combination thereof, the estimated length of flow tube by: determining, based on the transit time and the known speed of sound in the material of flow tube 152, the estimated length of the flow tube. In such an example, flow sensor system 102 and/or external computing system 104 may determine the estimated length of the flow tube according to the following Equation (1):

$$L_{est} = C_t \times \text{time\_of\_flight} \quad (1)$$

where $L_{est}$ is the estimated length of the flow tube, $C_t$ is the known speed of sound in the material of flow tube 152, and time_of_flight is the transit time of the at least one ultrasonic signal.

In some non-limiting embodiments or aspects, flow sensor system 102 and/or external computing system 104 may control, when flow tube 152 contains a fluid, the at least one of first piezoelectric sensor or transducer 154, second piezoelectric sensor or transducer 156, or any combination thereof to transmit the at least one ultrasonic signal to the other of first piezoelectric sensor or transducer 154, second piezoelectric sensor or transducer 156, or any combination thereof. For example, if there a fluid in flow tube 152, a main or major path for the at least one ultrasonic signal may be through the fluid. As an example, the fluid may include a saline fluid introduced to flow tube 152 during priming of ultrasonic flow sensor 150. As an example, the fluid in flow tube 152 may have a zero flow rate (e.g., the fluid may be within flow tube 152 but not flowing through flow tube 152, etc.). In such an example, flow sensor system 102 and/or external computing system 104 may determine, based on the transit time and the known speed of sound in at least one of (i) the material of flow tube 152, (ii) the fluid in flow tube 152, or any combination thereof, the estimated length of flow tube by: determining, based on the transit time and the known speed of sound in the fluid in flow tube 152, the estimated length of flow tube 152. For example, flow sensor system 102 and/or external computing system 104 may determine the estimated length of the flow tube according to the following Equation (2):

$$L_{est} = C_f \times \text{time\_of\_flight} \quad (2)$$

where $L_{est}$ is the estimated length of the flow tube, $C_f$ is the known speed of sound in the fluid in the flow tube 152, and time_of_flight is the transit time of the at least one ultrasonic signal.

Figure 3B:
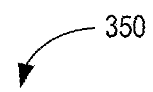
FIG. 3B is a flow diagram of a method of fluid measurement based on a method for calibrating ultrasonic flow sensors.
Figure 3B:
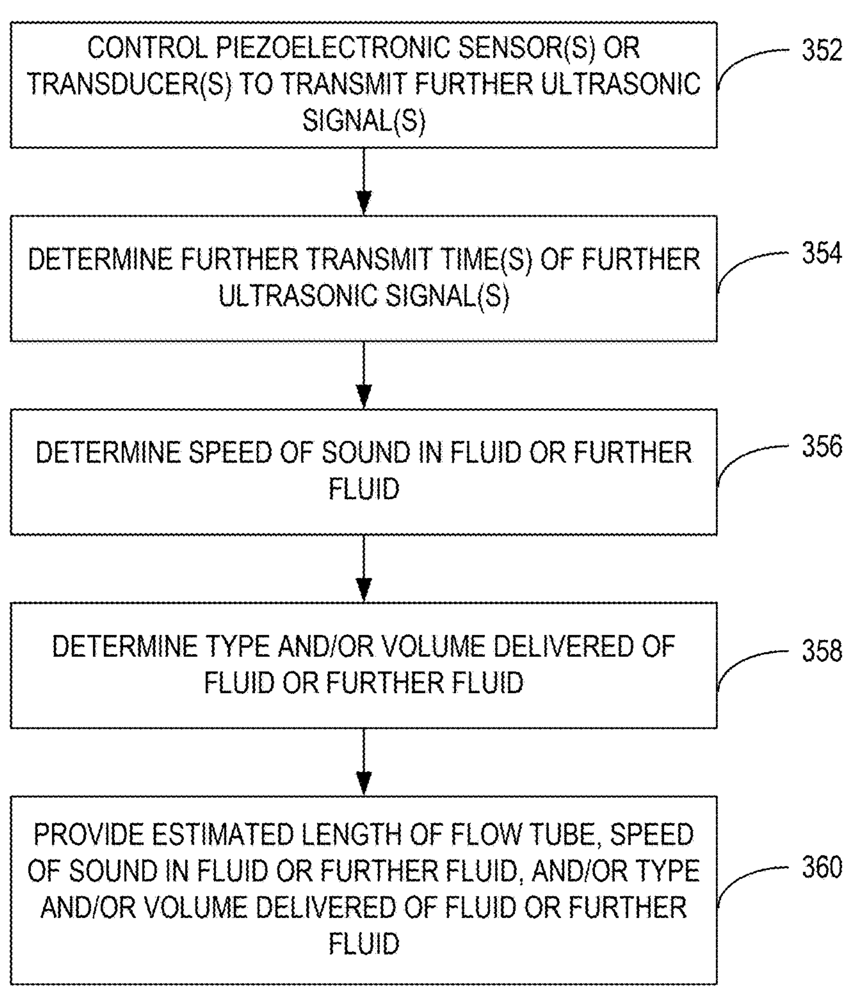

Referring now to FIG. 3B, shown is a flow diagram of a method 350 of fluid measurement based on a method for calibrating ultrasonic flow sensors, according to some non-limiting embodiments or aspects. The steps shown in FIG. 3B are for example purposes only. It will be appreciated that additional, fewer, different, or a different order of steps may be used in some non-limiting embodiments or aspects. In some non-limiting embodiments or aspects, a step may be automatically performed in response to performance or completion of a prior step. The method 350 may be controlled or performed, in whole or in part, by one or more of the devices or systems described.

As shown in FIG. 3B, at step 352, method 350 includes controlling, when the flow tube contains the fluid or a further fluid different than the fluid, the at least one of the first piezoelectric sensor or transducer, the second piezoelectric sensor or transducer, or any combination thereof to transmit at least one further ultrasonic signal to the other of the first piezoelectric sensor or transducer, the second piezoelectric sensor or transducer, or any combination thereof. For example, flow sensor system 102 and/or external computing system 104 may control, when flow tube 152 contains the fluid or a further fluid different than the fluid, the at least one of first piezoelectric sensor or transducer 154, second piezoelectric sensor or transducer 156, or any combination thereof to transmit at least one further ultrasonic signal to the other of first piezoelectric sensor or transducer 154, second piezoelectric sensor or transducer 156, or any combination thereof. As an example, flow sensor system 102 and/or external computing system 104 may provide the excitation pulse pattern including the number of excitation pulses to the at least one of first piezoelectric sensor or transducer 154, second piezoelectric sensor or transducer 156, or any combination thereof to cause the at least one of first piezoelectric sensor or transducer 154, second piezoelectric sensor or transducer 156, or any combination thereof to transmit at least one further ultrasonic signal to the other of first piezoelectric sensor or transducer 154, second piezoelectric sensor or transducer 156, or any combination thereof.

In some non-limiting embodiments or aspects, the at least one further ultrasonic signal includes a first further ultrasonic signal and a second further ultrasonic signal. For example, flow sensor system 102 and/or external computing system 104 may control the at least one of first piezoelectric sensor or transducer 154, second piezoelectric sensor or transducer 156, or any combination thereof to transmit the at least one further ultrasonic signal to the other of first piezoelectric sensor or transducer 154, second piezoelectric sensor or transducer 156, or any combination thereof by: controlling first piezoelectric sensor or transducer 154 to transmit the first further ultrasonic signal to second piezoelectric sensor or transducer 156 and controlling second piezoelectric sensor or transducer 156 to transmit the second further ultrasonic signal to first piezoelectric sensor or transducer 154. As an example, flow sensor system 102 and/or external computing system 104 may provide the excitation pulse pattern including the number of excitation pulses to first piezoelectric sensor or transducer 154 to cause first piezo electric sensor or transducer 154 transmit the first further ultrasonic signal to second piezoelectric sensor or transducer 156, and flow sensor system 102 and/or external computing system 104 may provide the excitation pulse pattern including the number of excitation pulses to second piezoelectric sensor or transducer 156 to cause second piezoelectric sensor or transducer 156 transmit the second further ultrasonic signal to first piezoelectric sensor or transducer 154. In such an example, flow sensor system 102 and/or external computing system 104 may provide the excitation pulse pattern including the number of excitation pulses to first piezo electric sensor or transducer 154 and second piezoelectric sensor or transducer 156 in an alternating manner (e.g., one after the other, etc.).

In some non-limiting embodiments or aspects, when flow sensor system 102 and/or external computing system 104 determine the estimated length of flow tube 152 using the at least one ultrasonic signal transmitted when flow tube 152 does not contain fluid (e.g., when flow tube 152 is empty, etc.), flow sensor system 102 and/or external computing system 104 may control, when flow tube 152 contains a fluid (e.g., a medication or drug, etc.), the at least one of first piezoelectric sensor or transducer 154, second piezoelectric sensor or transducer 156, or any combination thereof to transmit at least one further ultrasonic signal to the other of first piezoelectric sensor or transducer 154, second piezoelectric sensor or transducer 156, or any combination thereof.

In some non-limiting embodiments or aspects, when flow sensor system 102 and/or external computing system 104 determine the estimated length of flow tube 152 using the at least one ultrasonic signal transmitted when flow tube 152 contains a fluid (e.g., a saline fluid for priming, etc.), flow sensor system 102 and/or external computing system 104 may control, when flow tube 152 contains a further fluid (e.g., a medication or drug, etc.) different than the fluid, the at least one of first piezoelectric sensor or transducer 154, second piezoelectric sensor or transducer 156, or any combination thereof to transmit at least one further ultrasonic signal to the other of first piezoelectric sensor or transducer 154, second piezoelectric sensor or transducer 156, or any combination thereof.

As shown in FIG. 3B, at step 354, method 350 includes determining a further transit time of the at least one further ultrasonic signal as at least one further amount of time between transmission of the at least one further ultrasonic signal by the at least one of the first piezoelectric sensor or transducer, the second piezoelectric sensor or transducer, or any combination thereof and reception of the at least one further ultrasonic signal by the other of the first piezoelectric sensor or transducer, the second piezoelectric sensor or transducer, or any combination thereof. For example, flow sensor system 102 and/or external computing system 104 may determine a further transit time of the at least one further ultrasonic signal as at least one further amount of time between transmission of the at least one further ultrasonic signal by the at least one of first piezoelectric sensor or transducer 154, second piezoelectric sensor or transducer 156, or any combination thereof and reception of the at least one further ultrasonic signal by the other of first piezoelectric sensor or transducer 154, second piezoelectric sensor or transducer 156, or any combination thereof.

In some non-limiting embodiments or aspects, when flow sensor system 102 and/or external computing system 104 control first piezoelectric sensor or transducer 154 to transmit the first further ultrasonic signal to second piezoelectric sensor or transducer 156 and control second piezoelectric sensor or transducer 156 to transmit the second further ultrasonic signal to first piezoelectric sensor or transducer 154, the as at least one further amount of time includes (i) a first further amount of time between transmission of the first further ultrasonic signal by first piezoelectric sensor or transducer 154 and reception of the first further ultrasonic signal by second piezoelectric sensor or transducer 156 and (ii) a second amount of time between transmission of the second further ultrasonic signal by second piezoelectric sensor or transducer 156 and reception of the second further ultrasonic signal by first piezoelectric sensor or transducer 156. As an example, the further transit time may be determined as a sum of the first further amount of time and the second further amount of time, an average of the first further amount of time and the second further amount of time, or the like.

In some non-limiting embodiments or aspects, when flow sensor system 102 and/or external computing system 104 determine the estimated length of flow tube 152 using the at least one ultrasonic signal transmitted when flow tube 152 does not contain fluid (e.g., when flow tube 152 is empty, etc.), flow sensor system 102 and/or external computing system 104 may determine the further transit time of the at least one further ultrasonic signal when the flow tube 152 contains a fluid (e.g., a medication or drug, etc.).

In some non-limiting embodiments or aspects, when flow sensor system 102 and/or external computing system 104 determine the estimated length of flow tube 152 using the at least one ultrasonic signal transmitted when flow tube 152 contains a fluid (e.g., a saline fluid for priming, etc.), flow sensor system 102 and/or external computing system 104 may determine the further transit time of the at least one further ultrasonic signal when flow tube 152 contains a further fluid (e.g., a medication or drug, etc.) different than the fluid.

As shown in FIG. 3B, at step 356, method 350 includes determining, based on the further transit time and the estimated length of the flow tube, a speed of sound in the fluid or the further fluid. For example, flow sensor system 102 and/or external computing system 104 may determine, based on the further transit time and the estimated length of the flow tube, a speed of sound in the fluid or the further fluid. As an example, flow sensor system 102 and/or external computing system 104 may determine, based on the further transit time and the estimated length of the flow tube, a speed of sound in the fluid or the further fluid according to the following Equation (3):

$$C_f = \frac{L_{est}}{\text{time\_of\_flight}} \tag{3}$$

where $L_{est}$ is the estimated length of the flow tube, $C_f$ is the speed of sound in the fluid or the further fluid in the flow tube 152, and time_of_flight is the transit time of the at least one further ultrasonic signal.

In some non-limiting embodiments or aspects, when flow sensor system 102 and/or external computing system 104 determine the estimated length of flow tube 152 using the at least one ultrasonic signal transmitted when flow tube 152 does not contain fluid (e.g., when flow tube 152 is empty, etc.) and determine the further transit time of the at least one further ultrasonic signal when the flow tube 152 contains a fluid (e.g., a medication or drug, etc.), flow sensor system 102 and/or external computing system 104 may determine, based on the further transit time and the estimated length of the flow tube, a speed of sound in the fluid.

In some non-limiting embodiments or aspects, when flow sensor system 102 and/or external computing system 104 determine the estimated length of flow tube 152 using the at least one ultrasonic signal transmitted when flow tube 152 contains a fluid (e.g., a saline fluid for priming, etc.) and determine the further transit time of the at least one further ultrasonic signal when flow tube 152 contains a further fluid (e.g., a medication or drug, etc.) different than the fluid, flow sensor system 102 and/or external computing system 104 may determine, based on the further transit time and the estimated length of the flow tube, a speed of sound in the further fluid.

As shown in FIG. 3B, at step 358, method 350 includes determining, based on the speed of sound in the fluid or the further fluid, at least one of a type of the fluid or the further fluid, a volume of the fluid or the further fluid delivered via the flow tube, or any combination thereof. For example, flow sensor system 102 and/or external computing system 104 may determine, based on the speed of sound in the fluid or the further fluid, at least one of a type of the fluid or the further fluid, a volume of the fluid or the further fluid delivered via flow tube 152, or any combination thereof.

As an example, flow sensor system 102 and/or external computing system 104 may determine, based on the speed of sound in the fluid or the further fluid, using a look-up table including a plurality of differ speeds of sound corresponding to a plurality of different fluids (e.g., different drugs, different concentrations of a same drug, etc.), a type of the fluid or the further fluid (e.g., a drug type, a drug concentration, etc.).

As an example, flow sensor system 102 and/or external computing system 104 may determine, based on the speed of sound in the fluid or the further fluid, a volume of the fluid or the further fluid delivered via flow tube 152. As an example, and as described herein with respect to FIG. 1C, ultrasonic flow sensor 150 may be configured to generate a time-series corresponding to (e.g., corresponding to, representative of, quantifying, measuring, etc.) a flow of the fluid or the further fluid through a fluid flow path defined by flow tube 150 of ultrasonic flow sensor 150, and flow sensor system 102 and/or external computing system 104 may determine, based on the speed of sound in the fluid or the further fluid and the time-series, a volume of the fluid or the further fluid delivered via flow tube 152. In such an example, an error in flow tube length may introduce same amount of error in volume measurements. For example and referring to Equation (3), if a time measured for a signal is 3 milliseconds, it is not a given that the distance the signal traveled is the same for different ultrasonic flow sensors due to tube length variance; however, non-limiting embodiments or aspects of the present disclosure may be calibrated as described herein by determining an estimated length and use that estimated to "tune" a flow rate estimation calculation.

As shown in FIG. 3B, at step 360, method 350 includes providing at least one of the estimated length of the flow tube, the speed of sound in the fluid or the further fluid, the volume of the fluid or the further fluid delivered via the flow tube, or any combination thereof. For example, flow sensor system 102 and/or external computing system 104 may provide at least one of the estimated length of flow tube 152, the speed of sound in the fluid or the further fluid, the volume of the fluid or the further fluid delivered via flow tube 152, or any combination thereof. As an example, flow sensor system 102 and/or external computing system 104 may provide an indication associated with the at least one of the estimated length of flow tube 152, the speed of sound in the fluid or the further fluid, the volume of the fluid or the further fluid delivered via flow tube 152, or any combination thereof. The indication may be a human perceivable output indicating the at least one of the estimated length of flow tube 152, the speed of sound in the fluid or the further fluid, the volume of the fluid or the further fluid delivered via flow tube 152, or any combination thereof (e.g., provided via a speaker and/or a display of a reusable base of the flow sensor system in U.S. Patent Application Publication No. 2021/0231471, etc.). In some implementations, providing the indication may include storing a value in a location of a storage device for subsequent retrieval (e.g., in a memory of ultrasonic flow sensor 150, in a memory of flow sensory system, in a database etc.), transmitting a value directly to the recipient via at least one wired or wireless communication medium, transmitting or storing a reference to a value, and the like. The providing at step 316 may additionally or alternatively include encoding, decoding, encrypting, decrypting, validating, verifying, and the like via a hardware element.

In some non-limiting embodiments or aspects, flow sensor system 102 and/or external computing system 104 may provide the indication associated with the at least one of the estimated length of flow tube 152, the speed of sound in the fluid or the further fluid, the volume of the fluid or the further fluid delivered via flow tube 152, or any combination thereof in association with patient data associated with a patient, procedure data associated with a patient procedure associated with the patient, caregiver data associated with a caregiver (e.g., a nurse, a doctor, etc.), any combination thereof, or the like. Patient data associated with a patient may include a patient identifier associated with the patient (e.g., a unique patient identifier, etc.), patient demographics (e.g., a name, an age, a sex, a weight, a height, a birthdate, an address, etc.), a list of medication allergies associated with the patient, a list of medication doses delivered, being delivered, and/or pending for delivery to the patient, any combination thereof, or the like. Procedure data may include a procedure identifier associated with the procedure (e.g., a unique procedure identifier, etc.), one or more medical devices associated with the procedure, a name of the procedure, a state of the procedure (e.g., scheduled for a future date and time, currently being performed, previously performed a previous date and time, etc.), a caregiver associated with the procedure, a patient associated with the procedure, any combination thereof, or the like. Caregiver data may include a caregiver identifier associated with the caregiver (e.g., a unique caregiver identifier, etc.), a name of the caregiver, any combination thereof, or the like.

Figure 4:
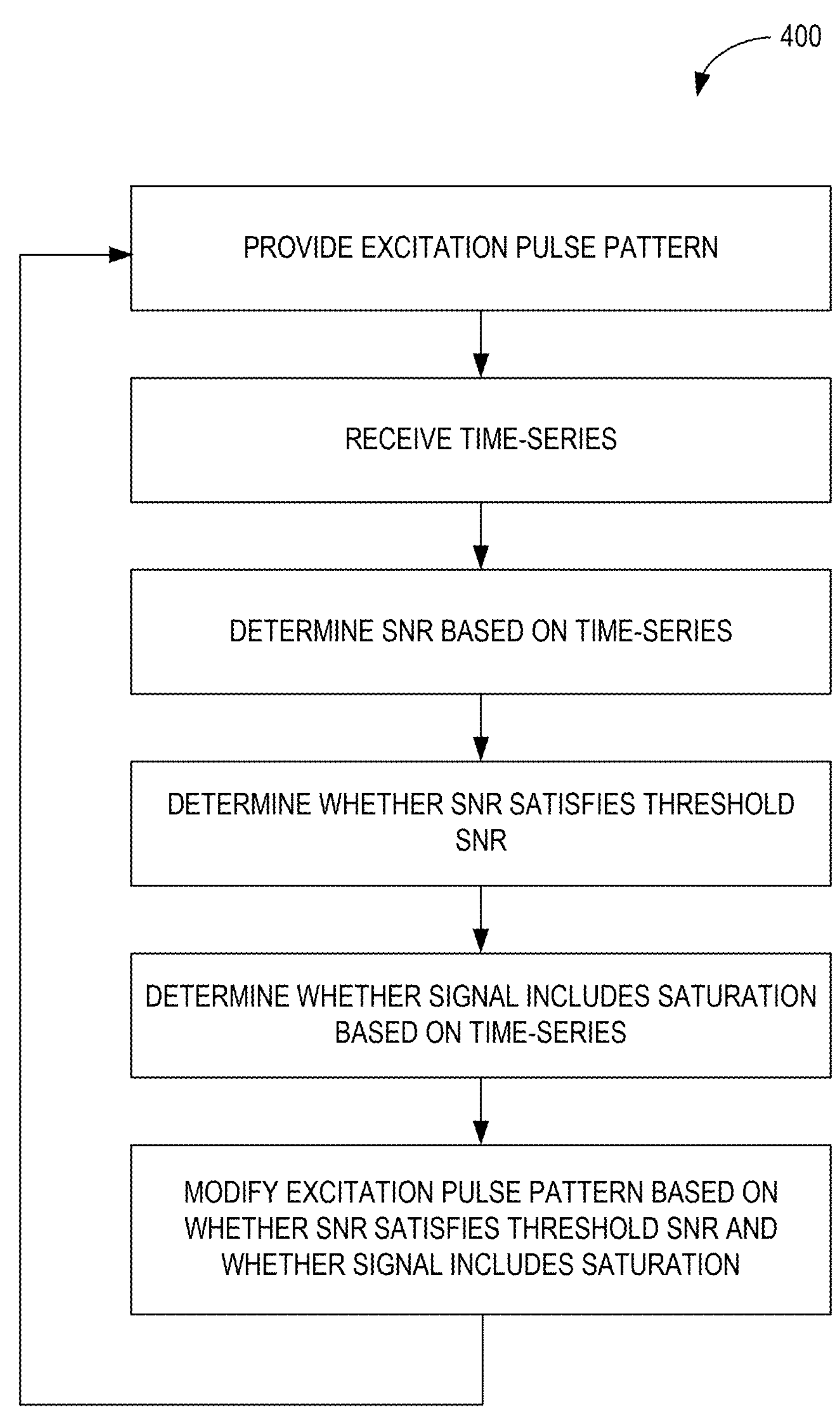
FIG. 4 is a flow diagram of a method for calibrating ultrasonic flow sensors, according to some non-limiting embodiments or aspects.

Referring now to FIG. 4, shown is a flow diagram for a method 400 for calibrating ultrasonic flow sensors, according to some non-limiting embodiments or aspects. The steps shown in FIG. 4 are for example purposes only. It will be appreciated that additional, fewer, different, or a different order of steps may be used in some non-limiting embodiments or aspects. In some non-limiting embodiments or aspects, a step may be automatically performed in response to performance or completion of a prior step. The method 400 may be controlled or performed, in whole or in part, by one or more of the devices or systems described.

As shown in FIG. 4, at step 402, method 400 includes providing an excitation pulse pattern including a number of excitation pulses to at least one of a first piezoelectric sensor or transducer, a second piezoelectric sensor or transducer, or any combination thereof of an ultrasonic flow sensor to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof. For example, flow sensor system 102 and/or external computing system 104 may provide an excitation pulse pattern including a number of excitation pulses to at least one of first piezoelectric sensor or transducer 154, second piezoelectric sensor or transducer 156, or any combination thereof of ultrasonic flow sensor 150 to cause the least one of first piezoelectric sensor or transducer 154, second piezoelectric sensor or transducer 156, or any combination thereof to transmit at least one ultrasonic signal to the other of first piezoelectric sensor or transducer 154, second piezoelectric sensor or transducer 156, or any combination thereof.

As shown in FIG. 4, at step 404, method 400 includes receiving, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points. For example, flow sensor system 102 and/or external computing system 104 may receive, from ultrasonic flow sensor 150, a time-series that includes a plurality of amplitudes of the at least one ultrasonic signal received at the other of first piezoelectric sensor or transducer 154, second piezoelectric sensor or transducer 156, or any combination thereof sampled at a plurality of time points. As an example, a an analog-to-digital converter (ADC) may sample the at least one ultrasonic signal received at the other of first piezoelectric sensor or transducer 154, second piezoelectric sensor or transducer 156, or any combination thereof at a plurality of time points to generate the time-series that includes the plurality of amplitudes of the at least one ultrasonic signal sampled at the plurality of time points, and flow sensor system 102 and/or external computing system 104 may receive the time-series from the ADC.

As shown in FIG. 4, at step 406, method 400 includes determining, based on the time-series that includes the plurality of amplitudes of the at least one ultrasonic signal sampled at the plurality of time points, a signal-to-noise ratio (SNR) associated with the at least one ultrasonic signal. For example, flow sensor system 102 and/or external computing system 104 may determine, based on the time-series that includes the plurality of amplitudes of the at least one ultrasonic signal sampled at the plurality of time points, a SNR associated with the at least one ultrasonic signal. As an example, flow sensor system 102 and/or external computing system 104 may use one or more existing techniques for determining a SNR of a received signal using a time-series representation that signal.

In some non-limiting embodiments or aspects, flow sensor system 102 and/or external computing system 104 may determine, based on the time-series that includes the plurality of amplitudes of the at least one ultrasonic signal sampled at the plurality of time points, the SNR associated with the at least one ultrasonic signal according to the following Equation (4):

$$SNR = \frac{\sum sig[n_1:n_2]^2}{4\sum sig[n_3:n_4]^2} \quad (4)$$

where $n_1$ and $n_2$ are time points of the plurality of time points of the time-series that includes the plurality of amplitudes of the at least one ultrasonic signal sampled at the plurality of time points, and where $n_3$ and $n_4$ are further time points of a plurality of further time points of a further time-series representative of noise, for example, a further time-series that that includes a plurality of amplitudes sampled at a plurality of further time points outside the at least one ultrasonic signal (e.g., sampled outside a period between transmission and reception of the at least one ultrasonic signal, etc.).

Figure 5:
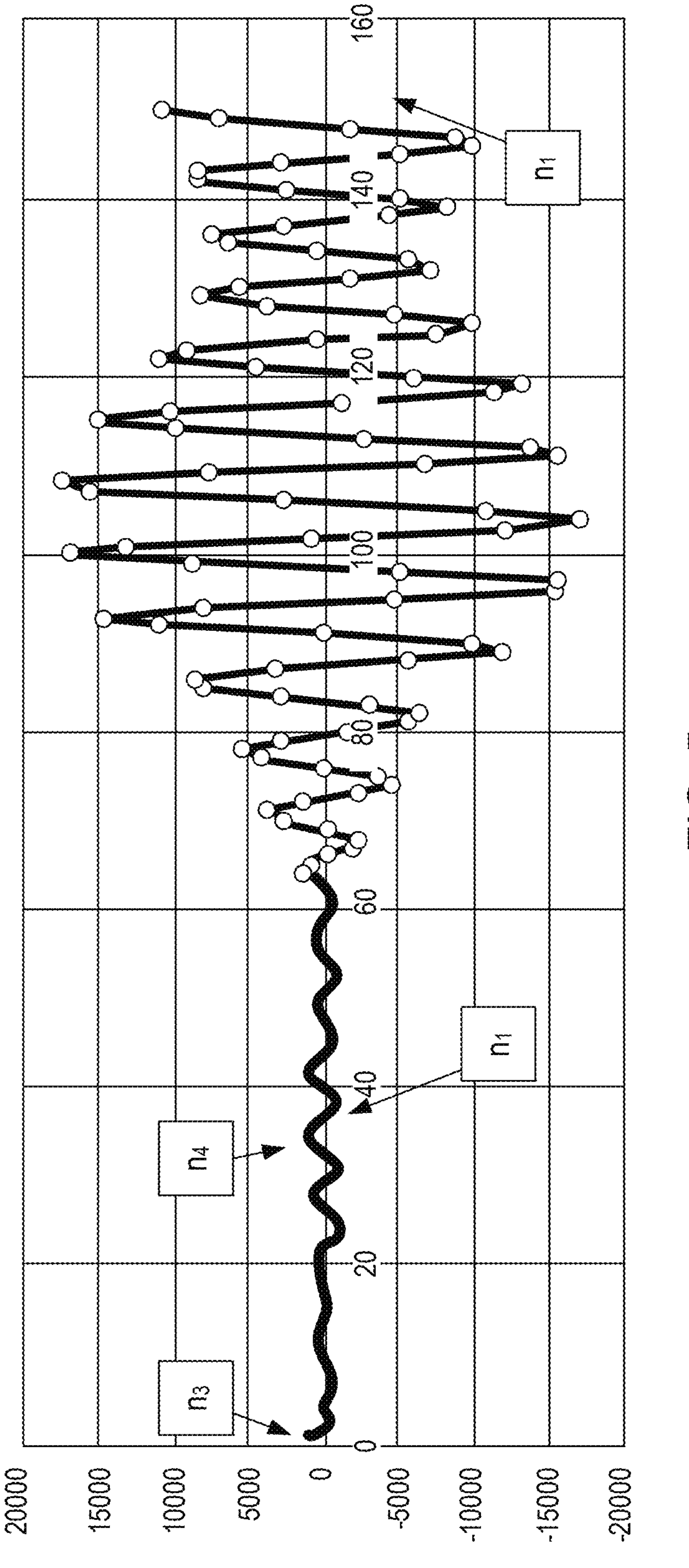
FIG. 5 is a graph of an example time-series including examples ranges of samples for calculating a signal-to-noise ratio (SNR)

For example, and referring also to FIG. 5, which is a graph of an example time-series including examples ranges of samples for calculating a SNR, the SNR may be defined according to a sum of square values of the signal at locations $n_1$ to $n_2$ divided by 4 times sum of squares of the signal at locations $n_3$ to $n_4$. As an example, signal power may be estimated from samples $n_1$:$n_2$ (e.g., an example nominal value for this range may be 30:150 in a 150 sample time-series, etc.), and/or noise power may be estimated from $n_3$:$n_4$ (e., an example nominal value for this range may be 0:30 in a 150 sample time-series, etc.). The $n_4$-$n_3$ values may not contain any information about the signal (e.g., the at least one ultrasonic signal, etc.) and therefore, may represent a noise of the channel, which may be derived based on a specification of ultrasonic flow sensor 150.

As shown in FIG. 4, at step 408, method 400 includes determining whether the SNR associated with the at least one ultrasonic signal satisfies at least one threshold SNR ratio. For example, flow sensor system 102 and/or external computing system 104 may determine whether the SNR associated with the at least one ultrasonic signal satisfies at least one threshold SNR ratio. As an example, the at least one threshold SNR may include a desired or predetermined SNR.

Figure 6:
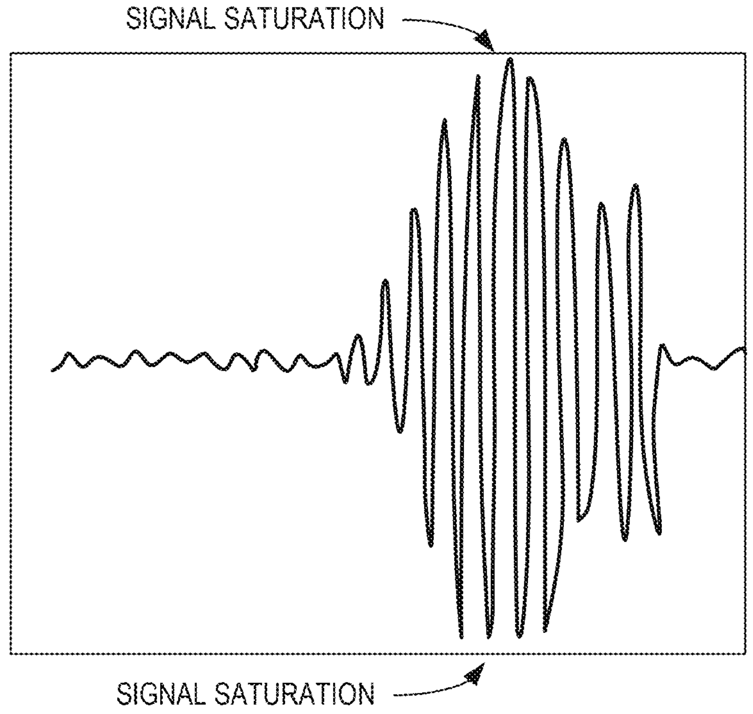
FIG. 6 is a graph of an example time series including saturation.

As shown in FIG. 4, at step 410, method 400 includes determining, based on the time-series that includes the plurality of amplitudes of the at least one ultrasonic signal sampled at the plurality of time points, whether the at least one ultrasonic signal includes saturation. For example, flow sensor system 102 and/or external computing system 104 may determine, based on the time-series that includes the plurality of amplitudes of the at least one ultrasonic signal sampled at the plurality of time points, whether the at least one ultrasonic signal includes saturation. As an example, and referring to FIG. 6, which is a graph of an example time series including saturation, for some pulse ping pattern configurations, time-series data may include saturation due to a limitation of an ADC, thereby creating challenges in determining a peak of the signal. In order to avoid saturation, non-limiting embodiments or aspects of the present disclosure may alter the pulse ping pattern (e.g., provide less pulses, etc.) as described in more detail herein.

In some non-limiting embodiments or aspects, flow sensor system 102 and/or external computing system 104 may determine, based on the time-series that includes the plurality of amplitudes of the at least one ultrasonic signal sampled at the plurality of time points, whether the at least one ultrasonic signal includes saturation by: determining a maximum amplitude of the plurality of amplitudes of the at least one ultrasonic signal sampled at the plurality of time points; determining whether the time-series includes a number of consecutive time points of the plurality of time points with an amplitude that corresponds to (e.g., corresponds to, matches, is within a predetermined range of, etc.) the maximum amplitude; in response to determining that the time-series includes the number of consecutive time points of the plurality of time points with the amplitude that corresponds to the maximum amplitude, determining that the at least one ultrasonic signal includes saturation; in response to determining that the time-series does not include the number of consecutive time points of the plurality of time points with the amplitude that corresponds to the maximum amplitude, determining that the at least one ultrasonic signal does not include saturation.

In some non-limiting embodiments or aspects, flow sensor system 102 and/or external computing system 104 may determine, based on the time-series that includes the plurality of amplitudes of the at least one ultrasonic signal sampled at the plurality of time points, whether the at least one ultrasonic signal includes saturation by: providing, as input to at least one machine learning model, the time-series; and receiving, as output from the at least one machine learning model, a prediction of whether the at least one ultrasonic signal includes saturation. The at least one machine learning model (e.g., a neural network, a recurrent neural network, a convolutional neural network, etc.) may be trained using machine learning or other artificial intelligence techniques to accept, as input, the time-series (e.g., a feature representation associated with the time-series, etc.) and provide, as output, the prediction of whether the at least one ultrasonic signal includes saturation.

As shown in FIG. 4, at step 412, method 400 includes modifying, based (i) whether the SNR associated with the at least one ultrasonic signal satisfies the at least one threshold SNR ratio and (ii) whether the at least one ultrasonic signal includes saturation, the number of excitation pulses included in the excitation pulse pattern. For example, flow sensor system 102 and/or external computing system 104 may modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern. In such an example, flow sensor system 102 and/or external computing system 104 may repeat steps 402-412 of method 400 until, for a same iteration of the at least one ultrasonic signal (e.g., for a same iteration of the excitation pulse pattern, etc.), each of (i) the SNR associated with the same iteration of the at least one ultrasonic signal is determined to fail to satisfy the at least one threshold SNR ratio and (ii) the same iteration of the at least one ultrasonic signal is determined to not include saturation. For example, flow sensor system 102 and/or external computing system 104 may store and/or use for future excitation operations the excitation pulse pattern including the number of excitation pulses included in the excitation pulse pattern when each of (i) the SNR associated with the same iteration of the at least one ultrasonic signal was determined to fail to satisfy the at least one threshold SNR ratio and (ii) the same iteration of the at least one ultrasonic signal was determined to not include saturation.

In some non-limiting embodiments or aspects, flow sensor system 102 and/or external computing system 104 may modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by: in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern. For example, flow sensor system 102 and/or external computing system 104 may modify by a predetermined value (e.g., one pulse, a single pulse, a plurality of pulses, etc.) the number of excitation pulses included in the excitation pulse pattern. As an example, flow sensor system 102 and/or external computing system 104 may modify the number of excitation pulses included in the excitation pulse pattern by increasing the number of excitation pulses included in the excitation pulse pattern by one pulse in response to determining that the SNR associated with the at least one ultrasonic signal satisfies the at least one threshold SNR ratio. As an example, flow sensor system 102 and/or external computing system 104 may modify the number of excitation pulses included in the excitation pulse pattern by decreasing the number of excitation pulses included in the excitation pulse pattern by one pulse in response to determining that the at least one ultrasonic signal includes saturation. Again, in such an example, flow sensor system 102 and/or external computing system 104 may repeat steps 402-412 of method 400 until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

Accordingly, if saturation is observed for a time-series generated from a pulse ping pattern, the number of pulses in the ping pattern may be reduced (e.g., by 1, etc.) and a next pulse ping pattern applied to generate a next time series may use this new configuration with a reduced number of pulses. With the next pulse ping pattern applied with the reduced number of pulses, the new time-series may be collected and analyzed and the process may be repeated until no further saturation is observed. If by analyzing the time-series a low SNR is observed (e.g., a SNR that satisfies a SNR threshold, etc.), the pulse ping pattern may be modified to increase the number of pulses (e.g., by 1, etc.) and a next pulse ping pattern applied to generate a next time series may use this new configuration with an increased number of pulses. With the next pulse ping pattern applied with the increased number of pulses, the new time-series may be collected and analyzed and the process may be repeated until a low SNR is no longer observed.

In some non-limiting embodiments or aspects, flow sensor system 102 and/or external computing system 104 may modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by: providing, as input to one or more machine learning models, at least one of the time-series, the SNR, an indication of whether the at least one ultrasonic signal includes saturation, or any combination thereof; and receiving, as output from the one or more machine learning models, a modification to the number of excitation pulses included in the excitation pulse pattern. The one or more machine learning models (e.g., a neural network, a recurrent neural network, a convolutional neural network, etc.) may be trained using machine learning or other artificial intelligence techniques to accept, as input, at least one of the time-series (e.g., a feature representation associated with the time-series, etc.), the SNR (e.g., a feature representation associated with the SNR, etc.), an indication of whether the at least one ultrasonic signal includes saturation (e.g., a feature representation associated with the indication of whether the at least one ultrasonic signal includes saturation, or any combination thereof and provide, as output, the modification to the number of excitation pulses included in the excitation pulse pattern.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

Aspects described include artificial intelligence or other operations whereby the system processes inputs and generates outputs with apparent intelligence. The artificial intelligence may be implemented in whole or in part by a model. A model may be implemented as a machine learning model. The learning may be supervised, unsupervised, reinforced, or a hybrid learning whereby multiple learning techniques are employed to generate the model. The learning may be performed as part of training. Training the model may include obtaining a set of training data and adjusting characteristics of the model to obtain a desired model output. For example, three characteristics may be associated with a desired item location. In such instance, the training may include receiving the three characteristics as inputs to the model and adjusting the characteristics of the model such that for each set of three characteristics, the output device state matches the desired device state associated with the historical data.

In some implementations, the training may be dynamic. For example, the system may update the model using a set of events. The detectable properties from the events may be used to adjust the model.

The model may be an equation, artificial neural network, recurrent neural network, convolutional neural network, decision tree, or other machine-readable artificial intelligence structure. The characteristics of the structure available for adjusting during training may vary based on the model selected. For example, if a neural network is the selected model, characteristics may include input elements, network layers, node density, node activation thresholds, weights between nodes, input or output value weights, or the like. If the model is implemented as an equation (e.g., regression), the characteristics may include weights for the input parameters, thresholds, or limits for evaluating an output value, or criterion for selecting from a set of equations.

Once a model is trained, retraining may be included to refine or update the model to reflect additional data or specific operational conditions. The retraining may be based on one or more signals detected by a device described herein or as part of a method described herein. Upon detection of the designated signals, the system may activate a training process to adjust the model as described.

Further examples of machine learning and modeling features which may be included in the embodiments discussed above are described in "A survey of machine learning for big data processing" by Qiu et al. in EURASIP Journal on Advances in Signal Processing (2016) which is hereby incorporated by reference in its entirety.

What is claimed is:

1. A system comprising:

an ultrasonic flow sensor that includes a flow tube, a first piezoelectric sensor or transducer arranged at an upstream position of the flow tube, and a second piezoelectric sensor or transducer arranged at a downstream position of the flow tube; and at least one processor configured to:

(i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof;

(ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points;

(iii) determine, based on the time-series that includes the plurality of amplitudes of the at least one ultrasonic signal sampled at the plurality of time points, a signal-to-noise ratio (SNR) associated with the at least one ultrasonic signal;

(iv) determine whether the SNR associated with the at least one ultrasonic signal satisfies at least one threshold SNR ratio;

(v) determine, based on the time-series that includes the plurality of amplitudes of the at least one ultrasonic signal sampled at the plurality of time points, whether the at least one ultrasonic signal includes saturation; and (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

2. The system of claim 1, wherein the at least one processor is configured to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by:

in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

3. The system of claim 2, wherein the at least one processor is further configured to:

repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

4. The system of claim 1, wherein the at least one processor is configured to modify, based (i) whether the SNR associated with the at least one ultrasonic signal satisfies the at least one threshold SNR ratio and (ii) whether the at least one ultrasonic signal includes saturation, the number of excitation pulses included in the excitation pulse pattern by:

providing, as input to one or more machine learning models, at least one of the time-series, the SNR, an indication of whether the at least one ultrasonic signal includes saturation, or any combination thereof; and receiving, as output from the one or more machine learning models, a modification to the number of excitation pulses included in the excitation pulse pattern.

5. The system of claim 1, wherein the at least one processor is configured to determine, based on the time-series that includes the plurality of amplitudes of the at least one ultrasonic signal sampled at the plurality of time points, the SNR associated with the at least one ultrasonic signal according to the following Equation:

$$SNR = \frac{\sum sig[n_1 : n_2]^2}{4 \sum sig[n_3 : n_4]^2}$$

where $n_1$ and $n_2$ are time points of the plurality of time points of the time-series that includes the plurality of amplitudes of the at least one ultrasonic signal sampled at the plurality of time points, and where $n_3$ and $n_4$ are further time points of a plurality of further time points of a further time-series representative of noise.

6. The system of claim 1, wherein the at least one processor is configured to determine, based on the time-series that includes the plurality of amplitudes of the at least one ultrasonic signal sampled at the plurality of time points, whether the at least one ultrasonic signal includes saturation by:

determining a maximum amplitude of the plurality of amplitudes of the at least one ultrasonic signal sampled at the plurality of time points;

determining whether the time-series includes a number of consecutive time points of the plurality of time points with an amplitude that corresponds to the maximum amplitude;

in response to determining that the time-series includes the number of consecutive time points of the plurality of time points with the amplitude that corresponds to the maximum amplitude, determining that the at least one ultrasonic signal includes saturation; and in response to determining that the time-series does not include the number of consecutive time points of the plurality of time points with the amplitude that corresponds to the maximum amplitude, determining that the at least one ultrasonic signal does not include saturation.

7. The system of claim 1, wherein the at least one processor is configured to determine, based on the time-series that includes the plurality of amplitudes of the at least one ultrasonic signal sampled at the plurality of time points, whether the at least one ultrasonic signal includes saturation by:

providing, as input to at least one machine learning model, the time-series; and receiving, as output from the at least one machine learning model, a prediction of whether the at least one ultrasonic signal includes saturation.

8. A method for calibrating an ultrasonic flow sensor that includes a flow tube, a first piezoelectric sensor or transducer arranged at an upstream position of the flow tube, and a second piezoelectric sensor or transducer arranged at a downstream position of the flow tube, the method comprising:

(i) providing, with at least one processor, an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof;

(ii) receiving, with the at least one processor, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points;

(iii) determining, with the at least one processor, based on the time-series that includes the plurality of amplitudes of the at least one ultrasonic signal sampled at the plurality of time points, a signal-to-noise ratio (SNR) associated with the at least one ultrasonic signal;

(iv) determining, with the at least one processor, whether the SNR associated with the at least one ultrasonic signal satisfies at least one threshold SNR ratio;

(v) determining, with the at least one processor, based on the time-series that includes the plurality of amplitudes of the at least one ultrasonic signal sampled at the plurality of time points, whether the at least one ultrasonic signal includes saturation; and (vi) modifying, with the at least one processor, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

9. The method of claim 8, wherein modifying, with the at least one processor, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern includes:

in response to determining that the SNR associated with the at least one ultrasonic signal satisfies the at least one threshold SNR ratio, increasing, with the at least one processor, the number of excitation pulses included in the excitation pulse pattern; and in response to determining that the at least one ultrasonic signal includes saturation, decreasing, with the at least one processor, the number of excitation pulses included in the excitation pulse pattern.

10. The method of claim 9, further comprising:

repeating, with the at least one processor, (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

11. The method of claim 8, wherein modifying, with the at least one processor, based (i) whether the SNR associated with the at least one ultrasonic signal satisfies the at least one threshold SNR ratio and (ii) whether the at least one ultrasonic signal includes saturation, the number of excitation pulses included in the excitation pulse pattern includes:

providing, with the at least one processor, as input to one or more machine learning models, at least one of the time-series, the SNR, an indication of whether the at least one ultrasonic signal includes saturation, or any combination thereof; and receiving, with the at least one processor, as output from the one or more machine learning models, a modification to the number of excitation pulses included in the excitation pulse pattern.

12. The method of claim 8, wherein the at least one processor determines, based on the time-series that includes the plurality of amplitudes of the at least one ultrasonic signal sampled at the plurality of time points, the SNR associated with the at least one ultrasonic signal according to the following Equation:

$$SNR = \frac{\sum sig[n_1:n_2]^2}{4\sum sig[n_3:n_4]^2}$$

where $n_1$ and $n_2$ are time points of the plurality of time points of the time-series that includes the plurality of amplitudes of the at least one ultrasonic signal sampled at the plurality of time points, and where $n_3$ and $n_4$ are further time points of a plurality of further time points of a further time-series representative of noise.

13. The method of claim 8, wherein determining, with the at least one processor, based on the time-series that includes the plurality of amplitudes of the at least one ultrasonic signal sampled at the plurality of time points, whether the at least one ultrasonic signal includes saturation includes:

determining, with the at least one processor, a maximum amplitude of the plurality of amplitudes of the at least one ultrasonic signal sampled at the plurality of time points;

determining, with the at least one processor, whether the time-series includes a number of consecutive time points of the plurality of time points with an amplitude that corresponds to the maximum amplitude;

in response to determining that the time-series includes the number of consecutive time points of the plurality of time points with the amplitude that corresponds to the maximum amplitude, determining, with the at least one processor, that the at least one ultrasonic signal includes saturation; and in response to determining that the time-series does not include the number of consecutive time points of the plurality of time points with the amplitude that corresponds to the maximum amplitude, determining, with the at least one processor, that the at least one ultrasonic signal does not include saturation.

14. The method of claim 8, wherein determining, with the at least one processor, based on the time-series that includes the plurality of amplitudes of the at least one ultrasonic signal sampled at the plurality of time points, whether the at least one ultrasonic signal includes saturation includes:

providing, with the at least one processor, as input to at least one machine learning model, the time-series; and receiving, with the at least one processor, as output from the at least one machine learning model, a prediction of whether the at least one ultrasonic signal includes saturation.

15. An ultrasonic flow sensor comprising:

a flow tube;

a first piezoelectric sensor or transducer arranged at an upstream position of the flow tube;

a second piezoelectric sensor or transducer arranged at a downstream position of the flow tube; and at least one processor configured to:

(i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof;

(ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points;

(iii) determine, based on the time-series that includes the plurality of amplitudes of the at least one ultrasonic signal sampled at the plurality of time points, a signal-to-noise ratio (SNR) associated with the at least one ultrasonic signal;

(iv) determine whether the SNR associated with the at least one ultrasonic signal satisfies at least one threshold SNR ratio;

(v) determine, based on the time-series that includes the plurality of amplitudes of the at least one ultrasonic signal sampled at the plurality of time points, whether the at least one ultrasonic signal includes saturation; and (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

16. The ultrasonic flow sensor of claim 15, wherein the at least one processor is configured to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by:

in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

17. The ultrasonic flow sensor of claim 16, wherein the at least one processor is further configured to:

repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

18. A computer program product including a non-transitory computer readable medium including program instructions for calibrating an ultrasonic flow sensor that includes a flow tube, a first piezoelectric sensor or transducer arranged at an upstream position of the flow tube, and a second piezoelectric sensor or transducer arranged at a downstream position of the flow tub which, when executed by at least one processor, cause the at least one processor to:

(i) provide an excitation pulse pattern including a number of excitation pulses to at least one of the first piezoelectric sensor or transducer, the second piezoelectric sensor or transducer, or any combination thereof to cause the least one of the first piezoelectric sensor or transducer, the second piezoelectric sensor or transducer, or any combination thereof to transmit at least one ultrasonic signal to the other of the first piezoelectric sensor or transducer, the second piezoelectric sensor or transducer, or any combination thereof;

(ii) receive, from the ultrasonic flow sensor, a time-series that includes a plurality of amplitudes of the at least one ultrasonic signal received at the other of the first piezoelectric sensor or transducer, the second piezoelectric sensor or transducer, or any combination thereof sampled at a plurality of time points;

(iii) determine, based on the time-series that includes the plurality of amplitudes of the at least one ultrasonic signal sampled at the plurality of time points, a signal-to-noise ratio (SNR) associated with the at least one ultrasonic signal;

(iv) determine whether the SNR associated with the at least one ultrasonic signal satisfies at least one threshold SNR ratio;

(v) determine, based on the time-series that includes the plurality of amplitudes of the at least one ultrasonic signal sampled at the plurality of time points, whether the at least one ultrasonic signal includes saturation; and (vi) modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern.

19. The computer program product of claim 18, wherein the program instructions, when executed by the at least one processor, cause the at least one processor to modify, based on (i) whether the SNR associated with the at least one ultrasonic signal satisfies the at least one threshold SNR ratio and (ii) whether the at least one ultrasonic signal includes saturation, the number of excitation pulses included in the excitation pulse pattern by:

in response to determining that the SNR associated with the at least one ultrasonic signal satisfies the at least one threshold SNR ratio, increasing the number of excitation pulses included in the excitation pulse pattern; and in response to determining that the at least one ultrasonic signal includes saturation, decreasing the number of excitation pulses included in the excitation pulse pattern.

20. The computer program product of claim 19, wherein the program instructions, when executed by the at least one processor, further cause the at least one processor to repeat (i)-(vi) until, for a same iteration of the at least one ultrasonic signal, each of (i) the SNR associated with the same iteration of the at least one ultrasonic signal is determined to fail to satisfy the at least one threshold SNR ratio and (ii) the same iteration of the at least one ultrasonic signal is determined to not include saturation.

* * * * *